(12) United States Patent
Johnson et al.

(10) Patent No.: US 8,763,842 B2
(45) Date of Patent: Jul. 1, 2014

(54) WELL FLUID ADDITIVE SYSTEMS, WELL FLUIDS THEREFROM, AND METHODS OF MAKING USING SUCH SYSTEMS

(75) Inventors: Tommy Rex Johnson, Grand Coteau, LA (US); Dustin O'Neal, Huffman, TX (US)

(73) Assignee: Bulldog Chemicals, L.L.C., Huffman, TX (US)

( * ) Notice: Subject to any disclaimer, the term of this patent is extended or adjusted under 35 U.S.C. 154(b) by 115 days.

(21) Appl. No.: 12/415,983

(22) Filed: Mar. 31, 2009

(65) Prior Publication Data
US 2010/0243657 A1    Sep. 30, 2010

(51) Int. Cl.
*B65D 25/08* (2006.01)
*E21B 21/06* (2006.01)
*C09K 8/03* (2006.01)

(52) U.S. Cl.
CPC .............. *E21B 21/062* (2013.01); *B65D 25/08* (2013.01); *C09K 8/03* (2013.01)
USPC .......................................... 220/553; 220/507

(58) Field of Classification Search
CPC .......... B65D 25/08; B65D 25/04; B65D 1/24; B65D 1/36; B65D 57/00; C09K 8/05; C09K 8/06; C09K 8/04; C09K 8/02; E21B 21/063; E21B 21/062
USPC ............ 108/33; 507/140, 117, 126, 104, 103; 220/567.1, 564; 53/235
IPC ... B65D 1/24, 1/36, 25/08, 25/04, 57/00; C09K 8/05, 8/04, 8/06
See application file for complete search history.

(56) References Cited

U.S. PATENT DOCUMENTS

| | | | | |
|---|---|---|---|---|
| 38,765 | A * | 6/1863 | Seely | 220/564 |
| 991,715 | A * | 5/1911 | Good | 220/592.18 |
| 1,157,445 | A * | 10/1915 | Stewart | 220/563 |
| 2,011,347 | A * | 8/1935 | Ragonnet | 222/3 |
| 2,915,386 | A * | 12/1959 | Strauss | 428/576 |
| 3,221,825 | A * | 12/1965 | Henderson | 507/104 |
| 3,762,485 | A * | 10/1973 | Chesser et al. | 175/65 |
| 3,979,304 | A * | 9/1976 | Fischer et al. | 507/103 |
| 4,439,328 | A * | 3/1984 | Moity | 507/204 |
| 4,454,946 | A * | 6/1984 | Yokowo | 206/600 |
| 4,770,245 | A * | 9/1988 | Sydansk | 166/295 |
| 4,793,474 | A * | 12/1988 | Drake | 206/0.5 |
| 4,807,777 | A * | 2/1989 | Berwald et al. | 220/23.83 |
| 4,844,168 | A * | 7/1989 | Sydansk | 166/270 |
| 5,323,911 | A * | 6/1994 | Johnston et al. | 206/600 |
| 5,377,760 | A * | 1/1995 | Merrill | 166/295 |
| 5,415,229 | A * | 5/1995 | Sydansk | 166/295 |
| 5,763,367 | A * | 6/1998 | Burts, Jr. | 507/104 |
| 6,016,869 | A * | 1/2000 | Burts, Jr. | 166/295 |
| 6,016,871 | A * | 1/2000 | Burts, Jr. | 166/300 |
| 6,016,879 | A * | 1/2000 | Burts, Jr. | 175/72 |
| 6,098,712 | A * | 8/2000 | Burts, Jr. | 166/295 |
| 6,102,121 | A * | 8/2000 | Burts, Jr. | 166/295 |

\* cited by examiner

*Primary Examiner* — Robert J Hicks
(74) *Attorney, Agent, or Firm* — Gilbreth Roebuck PC; Jim (Mark) Gilbreth

(57) ABSTRACT

A well fluid additive system prepackaged to the specifications of each particular well. The system comprises a supporting member, and a plurality of additives which additive is each individually segregated from the other additives. This system reduces waste as the exact proportions are delivered to the well as needed.

19 Claims, 1 Drawing Sheet

WELL FLUID ADDITIVE SYSTEMS, WELL FLUIDS THEREFROM, AND METHODS OF MAKING USING SUCH SYSTEMS

REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to well fluid additives, to well fluids, to methods of making and using such additives and fluids, and to methods of operating wells. In another aspect, this invention relates to prepackaged well fluid additives, to well fluids containing such additives, to methods of making and using such additives and fluids, and to methods of operating wells by utilizing such prepackaged well fluid additives.

2. Description of the Related Art

The drilling of oil, gas and other types of wells typically involves the use of a number of well fluids. These fluids are typically circulated down into the well bore and return back to the surface in the annulus of the well bore.

About every type of well operation will have a specific type of well fluid. Non-limiting examples of well fluids include drilling fluids, drill-in and servicing fluids, fracturing fluids, completion fluids, well kill fluids, and many others. These will fluids generally comprise a base fluid, that is in many cases an aqueous fluid or non-aqueous fluid, and will further comprise a number of additives.

The well fluids are generally formulated at the well site. Generally, the well fluid is circulating down into the well bore and returning through the well bore annulus. Various additives are generally added the well fluid while it is circulating.

Various methods of formulating well fluids are known. Generally, those methods provide assembling the various component additives and then introducing those additives to the well fluid.

As a non-limiting example, there is the "sequential injection of components followed by in situ [(i.e., in the subterranean)] mixing. This is common with some gel systems because gel systems mixed on the surface are difficult to regulate. Systems mixed on the surface often gel at an excessive rate, forming gel balls before they can effectively penetrate the treatment region." U.S. Pat. No. 4,770,245, col. 1, lines 41-47. See also, U.S. Pat. No. 5,415,229, col. 1, lines 33-53; U.S. Pat. No. 5,377,760, col. 1, lines 34-38; U.S. Pat. No. 4,844,168, col. 1, lines 51-55.

As another non-limiting example, there is the formation of a additive solution at the surface. For example, the formation of a single aqueous gelation solution at the surface. See again, U.S. Pat. No. 5,415,229, col. 1, line 54 to col. 2, line 40. This solution was injected into the well, with other additives later following.

As another non-limiting example, this is the addition of other additives to an additive solution. For example, the addition of reinforcing fibers into the gelation solution." See, U.S. Pat. No. 5,377,760, col. 2, lines 42-50.

As another non-limiting, it is known to form a "dry mixture" of the well fluid ingredients, and then to this dry mixture is then added water to form the well fluid. See, U.S. Pat. Nos. 6,102,121; 6,098,712; 6,016,879; 6,016,871; 6,016,869; and 5,763,367.

However, with all of these methods, the various well fluid additives are shipped to the well site in bulk form. For example, there may be a pallet of additive A, a pallet of additive B, and a pallet of additive C. The formulation for that particular well may only call for a portion of the pallets of additives A, B and C. While it is true that the leftover pallet portions can be sent somewhere else and the remaining portions used, the reality is that once a pallet is opened, any unused bags of additives as well as any partial bags of additives risk going to waste.

Another problem with formulating the well fluid additives is that lesser trained personnel are handling the bags and formulating the additive composition. In the rush of the well operation, an order for 4 bags of A, 7 bags of B, and 3 bags of C can sometimes get jumbled.

Thus, there is a need in the art for delivery of well fluid additives to a well site that may reduce waste of additives.

There is another need in the art for delivery of the well fluid additives to a well site that may allow for more accurate formulation of the well fluid.

These and other needs in the art will become apparent to those of skill in the art upon review of this specification and accompanying figures.

SUMMARY OF THE INVENTION

The following presents a general summary of some of the many possible embodiments of this disclosure in order to provide a basic understanding of this disclosure. This summary is not an extensive overview of all embodiments of the disclosure. This summary is not intended to identify key or critical elements of the disclosure or to delineate or otherwise limit the scope of the claims. The following summary merely presents some concepts of the disclosure in a general form as a prelude to the more detailed description that follows.

According to one embodiment of the present invention, there is provided a well fluid additive system having a supporting member, and a plurality of additives supported by supporting member, wherein each additive is segregated from the other additives.

According to another embodiment of the present invention, there is provided a method of treating a well fluid, the method comprising contacting the well fluid with additives from a well fluid additive system. The well fluid additive system comprises a supporting member, and a plurality of additives supported by supporting member, wherein each additive is segregated from the other additives.

These and other embodiments of the present invention, will become apparent to those of skill in the art upon review of this specification and accompanying figures.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present so me concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION OF THE INVENTION

The present invention reference was specifically and individually set forth herein.

Figure 1:
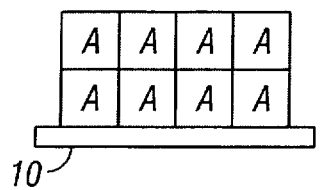
FIG. 1 is a side view of a pallet 10 having bags of additive A thereon.
Figure 2:
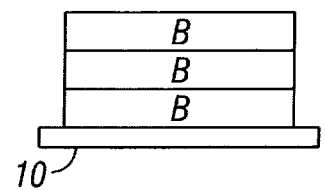
FIG. 2 is a side view of a pallet 10 having bags of additive B thereon.
Figure 3:
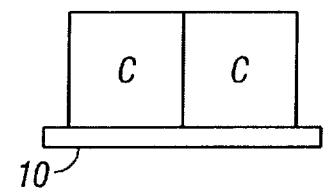
FIG. 3 is a side view of a pallet 10 having bags of additive C thereon.

Referring first to FIGS. 1-6, the present invention will first be described by reference to the current prior art methods. Currently, the well site will be provided with a number of pallets of additives. As a non-limiting example, a pallet 10 having 8 bags of additive A thereon such as shown in FIG. 1, another pallet 10 having 3 bags of additive B thereon, and another pallet 10 having 2 bags of additive C thereon.

Figure 4:
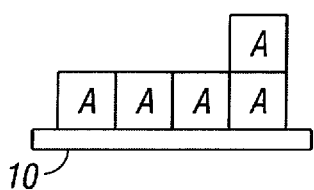
FIG. 4 is a side view of pallet 10 of FIG. 1 from which 3 bags of additive A have been removed, leaving 5 bags of additive A.
Figure 5:
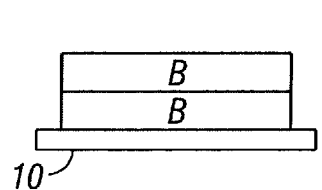
FIG. 5 is a side view of pallet 10 of FIG. 2 from which 1 bag of additive B has been removed, leaving 2 bags of additive B.
Figure 6:
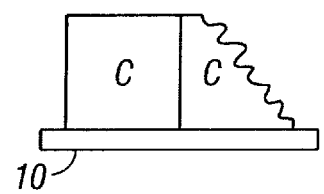
FIG. 6 is a side view of pallet 10 of FIG. 3 from which 1 bag of additive C has been opened and partially emptied, leaving 1 bag of additive C and an opened bag of additive C partially full.

As a non-limiting example, the well fluid formula may call for 3 bags of additive A, 1 bag of additive B, and ½ bag of additive C. In many instances, the pallets of additives are wrapped or enclosed in plastic to reduce exposure to precipitation. This plastic will have to be opened in order to remove any bags. After removal of the needed additives, FIG. 4 shows pallet 10 of FIG. 1 after removal of 3 bags of additive A, with 5 bags remaining, FIG. 5 shows pallet 10 of FIG. 2 after removal of 1 bag of additive B, with 2 bags remaining, and FIG. 6 shows pallet 10 of FIG. 3 after opening of 1 bag of additive C and removal of a portion thereof, with 1 and a partial bag of additive C remaining. Certainly, the partial bag of additive C is now exposed to the elements, and depending upon the bag materials, and how the plastic wrap around the pallet was opened, the remaining bags of additives A, B and C may also be exposed.

Furthermore, the accuracy of the formulation is subject to the well site personnel obtaining the correct bags of materials. While the current example was simple enough, formulation errors do occur from time to time.

Referring now to FIGS. 7-10 there is described various non-limiting embodiments of the present well fluid additive system of the present invention.

Figure 7:
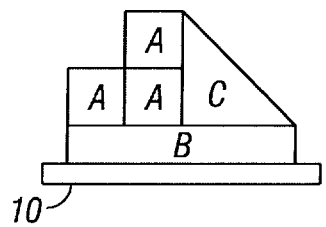
FIG. 7 is a side view of a pallet 10 showing a complete formulation of 3 bags of additive A, 1 bag of additive B, and ½ bag of additive C.

FIG. 7 is a side view of a supporting member, specifically, a pallet 10 showing a complete formulation of 3 bags of additive A, 1 bag of additive B, and ½ bag of additive C.

It should be understood that the present invention contemplates any suitable type and number of additives. As a non-limiting example, the well fluid additive system of the present may comprise 2, 3, 4, 5, 6, 7, 8, 9, 10, 11, 12, 13, 14, 15, 16, 17, 18, 19, 20, 25, 30, 35, 40 or more types of additives, and for each additive may comprise any suitable amount of that additive.

As a non-limiting example, a drilling engineer may order the formulation, which then arrives as this pallet 10 of FIG. 7. This pallet may or may not be wrapped in plastic or some other enclosure to protect it from the elements.

In operation, quite simply, the well site personnel merely open the bags and add all of the contents on the pallet 10 to the well fluid. The contents may be added directly to the circulating well fluid, or the contents may be formed into an additive solution that is then added to the circulating well fluid. In some embodiments, the various contents of pallet 10 may be added in any order to the circulating well fluid, that is, all together, sequentially one at a time, or by groupings. In some embodiments, part of the various contents may be added directly from the bag without further mixing, and the remaining part of the various contents may be formed into a solution and then added.

In some non-limiting embodiments, the supporting member holding the container, and/or the containers holding the additives may be degradable upon contact with the well fluid. This means that the entire pallet may be dumped into the mud pit. The rate of degradation would need to be suitable to not uphold the well operation.

The base fluid used as the mixing fluid and/or in the well fluids of the present invention may comprise an aqueous-based fluid or a nonaqueous-based fluid. Where the base fluid is aqueous-based, the base fluid can comprise fresh water, salt water (e.g., water containing one or more salts dissolved therein), brine (e.g., saturated salt water), or seawater. Non-limiting examples of nonaqueous-based fluids that may be suitable include diesel, crude oil, kerosene, aromatic and nonaromatic mineral oils, olefins, and various other carriers and blends of any of the preceding examples such as paraffins, waxes, esters, and the like.

It should be understood that there exist numerous well fluid additives, the following of which are merely non-limiting examples, calcium carbonate (dry, solid), gilsonite (solid), sulfonated asphalt (solid), cellulose fiber, cedar fiber, fibers, thermoplastic fibers, thermoset fibers, loss circulation material, partially-hydrolyzed polyacrylamide (PHPA) (liquid or powder, used for increasing viscosity), beads, glass beads, thermoplastic beads, thermoset beads, ceramic beads, liquid lubricants (non-limiting examples of which include glycols, esters, alcohols, polyolefins, fish oil, soybean oil, diesel, mineral oil, etc.), lignite, lignosulfanate, bentonite (gel), barite, caustic soda, sodium bicarbonate, lime, polyanionic cellulose (PAC), starch, graphite, weighting agents, viscosity agents, surfactants, flow agents, cross-linking agents, and proppants.

Figure 8:
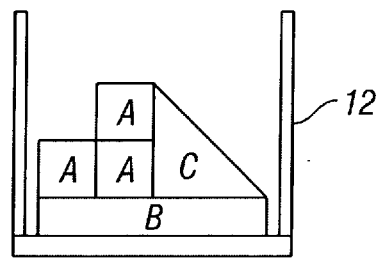
FIG. 8 is a side view of a container 12 showing a complete formulation of 3 bags of additive A, 1 bag of additive B, and ½ bag of additive C.

Referring now to FIG. 8, there is shown a side view of a supporting member, specifically a container 12, showing a complete formulation of 3 bags of additive A, 1 bag of additive B, and ½ bag of additive C. As opposed to a pallet, this container will provide more of an enclosure for the additives and may optionally include a top or lid.

Figure 9:
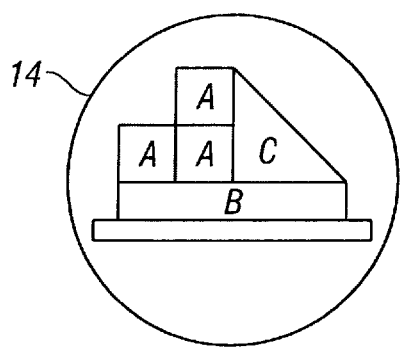
FIG. 9 is a side view of a enclosure 14 showing a complete formulation of 3 bags of additive A, 1 bag of additive B, and ½ bag of additive C.

Referring now to FIG. 9, there is shown a side view of a supporting member, specifically an enclosure 14, showing a complete formulation of 3 bags of additive A, 1 bag of additive B, and ½ bag of additive C. This enclosure 14 is typically a fabric wrap, plastic wrap, or the like, and will securely hold the additive containers together. While not shown, a plurality of straps, ropes, cables, netting, could be utilized as the supporting member to secure the additive containers together.

Figure 10:
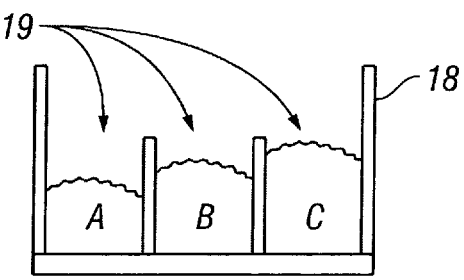
FIG. 10 is a side view of compartmentalized container pallet 18 showing a complete formulation of the contents of 3 bags of additive A in a first compartment 19, the contents of 1 bag of additive B in a second compartment 19, and the contents of ½ bag of additive C in a third compartment 19.

Referring now to FIG. 10, there is shown a side view of compartmentalized container pallet 18 showing a complete formulation of the contents of 3 bags of additive A in a first compartment 19, the contents of 1 bag of additive B in a second compartment 19, and the contents of ½ bag of additive C in a third compartment 19.

The apparatus, methods and products of the present invention have described and illustrated by examples. While these apparatus, methods and products have been described in terms of particular embodiments and illustrative figures, one of ordinary skill in the art will recognize that the invention and the appended claims are not limited to the embodiments or figures described. In addition, where methods and steps described above indicate certain events occurring in certain order, those of skill in the art will recognize that the ordering of certain steps may be modified and that such modifications are in accordance with the invention, and embodiments of the invention. Additionally, certain of the steps may be performed concurrently or in parallel processes when possible, as well as performed sequentially, as described above. Thus, to the extent that there are embodiments of the invention, which are within the spirit of the disclosure or equivalent to the inventions found in the claims, it is intended that the patent will cover those embodiments as well. Finally, all publications, patents and patent applications cited in this specification are herein incorporated by reference in their entirety as if each individual reference was specifically and individually set forth herein.

What is claimed is:

1. A well fluid additive system comprising:
   a supporting member; and
   a pre-packaged and pre-engineered plurality of well fluid additives supported by the supporting member, wherein each additive is segregated from the other additives;
   wherein at least a portion of the well fluid additive system is in contact with a well fluid circulating down into a subterranean well having an annulus and returning through the annulus.

2. The system of claim 1, wherein each additive is contained within a separate container.

3. The system of claim 1, wherein the supporting member is a pallet, and wherein each additive is contained within a separate container.

4. The system of claim 3, wherein the supporting member and the separate container for each additive are degradable when exposed to a well fluid.

5. The system of claim 3, wherein the supporting member comprises a plurality of compartments, with each additive contained within a separate one of said plurality of compartments.

6. The system of claim 1, wherein the supporting member encompasses the plurality of additives.

7. The system of claim 1, wherein the plurality of additives comprises at least three selected from the group consisting of calcium carbonate, gilsonite, sulfonated asphalt, cellulose fiber, cedar fiber, fibers, thermoplastic fibers, thermoset fibers, loss circulation material, partially-hydrolyzed polyacrylamide, beads, glass beads, thermoplastic beads, thermoset beads, ceramic beads, liquid lubricants, glycols, esters, alcohols, polyolefins, fish oil, soybean oil, diesel, mineral oil, lignite, lignosulfanate, bentonite, barite, caustic soda, sodium bicarbonate, lime, polyanionic cellulose, starch, graphite, weighting agents, viscosity agents, surfactants, flow agents, cross-linking agents, and proppants.

8. The system of claim 7, wherein the supporting member is a pallet, and wherein each additive is contained within a separate container.

9. A method of treating a well fluid circulating in a subterranean well having an annulus, the method comprising contacting the well fluid circulating down into the subterranean well and returning through the annulus with additives from a well fluid additive system, wherein the well fluid additive system comprises a supporting member, and a pre-packaged and pre-engineered plurality of additives supported by the supporting member, wherein each additive is segregated from the other additives.

10. The method of claim 9, wherein each additive is contained within a separate container.

11. The method of claim 9, wherein the supporting member is a pallet, and wherein each additive is contained within a separate container.

12. The system of claim 11, wherein the supporting member and the separate container for each additive are degradable when exposed to a well fluid.

13. The method of claim 11, wherein the supporting member comprises a plurality of compartments, with each additive contained within a separate one of said plurality of compartments.

14. The method of claim 9, wherein the supporting member encompasses the plurality of additives.

15. The method of claim 9, wherein the plurality of additives comprises at least three selected from the group consisting of calcium carbonate, gilsonite, sulfonated asphalt, cellulose fiber, cedar fiber, fibers, thermoplastic fibers, thermoset fibers, loss circulation material, partially-hydrolyzed polyacrylamide, beads, glass beads, thermoplastic beads, thermoset beads, ceramic beads, liquid lubricants, glycols, esters, alcohols, polyolefins, fish oil, soybean oil, diesel, mineral oil, lignite, lignosulfanate, bentonite, barite, caustic soda, sodium bicarbonate, lime, polyanionic cellulose, starch, graphite, weighting agents, viscosity agents, surfactants, flow agents, cross-linking agents, and proppants.

16. The method of claim 15, wherein the supporting member is a pallet, and wherein each additive is contained within a separate container.

17. The method of claim 9, wherein at least one of the additives is first formed into an additive solution that is then added to the well fluid.

18. The method of claim 9, wherein at least two of the additives contact the well fluid at the same time.

19. A well fluid system comprising:
   a well fluid circulating down into a subterranean well bore having an annulus and returning through the annulus;
   a well fluid additive system comprising
      a supporting member; and
      a pre-packaged and pre-engineered plurality of well fluid additives supported by the supporting member, wherein each additive is segregated from the other additives,
   wherein at least a portion of the well fluid additive system is in contact with the circulating well fluid.

* * * * *